US012599524B2

(12) United States Patent

Egelund et al.

(10) Patent No.: US 12,599,524 B2

(45) Date of Patent: Apr. 14, 2026

(54) INFLATABLE MAT FOR USE IN LATERAL POSITIONING

(71) Applicant: Levabo ApS, Solbjerg (DK)

(72) Inventors: Peter Egelund, Solbjerg (DK); Poul Solbjerg, Solbjerg (DK)

(73) Assignee: LEVABO APS, Fastrup (DK)

( * ) Notice: Subject to any disclaimer, the term of this patent is extended or adjusted under 35 U.S.C. 154(b) by 899 days.

(21) Appl. No.: 17/781,739

(22) PCT Filed: Dec. 3, 2020

(86) PCT No.: PCT/DK2020/050344

§ 371 (c)(1),
(2) Date: Jun. 2, 2022

(87) PCT Pub. No.: WO2021/110227

PCT Pub. Date: Jun. 10, 2021

(65) Prior Publication Data

US 2023/0000702 A1    Jan. 5, 2023

(30) Foreign Application Priority Data

Dec. 3, 2019 (DK) ........................... PA 2019 01423

(51) Int. Cl.
*A61G 7/057* (2006.01)

(52) U.S. Cl.
CPC ................................ *A61G 7/05776* (2013.01)

(58) Field of Classification Search
CPC ...... A61G 7/001; A61G 7/0525; A61G 7/057; A61G 7/05715; A61G 7/05769; A61G 7/05776; A61G 13/1265; A61G 13/127

(Continued)

(56) References Cited

U.S. PATENT DOCUMENTS 1,772,310 A * 8/1930 Hart ....................... A61G 7/001 91/40
3,477,071 A * 11/1969 Emerson ................ A61G 7/001 297/284.3

(Continued)

FOREIGN PATENT DOCUMENTS

CH 678268 A5 8/1991
WO WO-2019081954 A1 * 5/2019 ............... A61G 7/00

OTHER PUBLICATIONS

Vinyl Professionals—"Is Vinyl Really Fire Resistant?" Retrieved from: https://vinylprofessionals.com/2021/01/is-vinyl-really-fire-resistant/ (Year: 2021).*

(Continued)

*Primary Examiner* — David R Hare

(74) *Attorney, Agent, or Firm* — Cermak & McGowan LLP; Malcolm K. McGowan

(57) ABSTRACT

The present invention relates to a mat for use in lateral positioning. The invention provides an inflatable mat for use in lateral positioning in angled lateral decubitus, the mat comprising: a mat foil with a longitudinal direction, the mat foil having an upper side and a first side extending in the longitudinal direction, and a second side extending in the longitudinal direction, a first longitudinal section, comprising one or more inflatable air chambers, being arranged on the upper side of the mat foil along the first side of the mat foil, and a second longitudinal section, comprising one or more inflatable air chambers, being arranged on the upper side of the mat foil along the second side of the mat foil, the mat foil having a centre in the longitudinal direction, one or more first transverse sections, each comprising one or more inflatable air chambers, being arranged successively in a row in the longitudinal direction, the first transverse sections extending from the centre out towards the first side, so that (Continued)

the one or more transverse sections are arranged lying above the first longitudinal section away from the mat foil, one or more second transverse sections, each comprising one or more inflatable air chambers, being arranged successively in a row in the longitudinal direction, the transverse sections extending from the middle out towards the second side, the transverse sections being arranged lying above the second longitudinal section away from the mat foil, wherein the first longitudinal section, the second longitudinal section and the one or more first transverse sections and the one or more second transverse sections are connected to one or more air ducts arranged in each of the inflatable air chambers of said longitudinal and transverse sections, wherein the longitudinal and transverse sections can be individually inflated, the first side of the mat having a total first lateral height, which is the sum of a height of the first longitudinal section in the inflated state and a height of the first transverse section in the inflated state, the second side of the mat having a total second lateral height, the second lateral height being the height of the second longitudinal section in the inflated state, or the second side of the mat having a total second lateral height, which is the sum of a height of the second longitudinal section in the inflated state and a height of the second transverse section in the inflated state, and the first side of the mat having a total first lateral height, the first lateral height being the height of the first longitudinal section in the inflated state.

14 Claims, 1 Drawing Sheet

(58) Field of Classification Search
USPC .................................. 5/607, 613, 615, 655.3
See application file for complete search history.

(56) References Cited

U.S. PATENT DOCUMENTS

| | | | | | |
|---|---|---|---|---|---|
| 3,485,240 | A * | 12/1969 | Fountain | A61G 7/001 | 5/624 |
| 5,092,007 | A * | 3/1992 | Hasty | A61G 7/001 | 5/691 |
| 5,794,289 | A * | 8/1998 | Wortman | A61G 7/05769 | 5/713 |
| 5,966,762 | A * | 10/1999 | Wu | A61G 7/05769 | 5/713 |
| 6,085,372 | A * | 7/2000 | James | A61G 7/05784 | 5/713 |
| 6,154,900 | A * | 12/2000 | Shaw | A61G 7/001 | 5/81.1 R |
| 6,739,001 | B2 * | 5/2004 | Flick | A61G 7/05707 | 5/710 |
| 7,681,269 | B2 * | 3/2010 | Biggie | A61G 7/0507 | 5/709 |
| 7,712,171 | B2 * | 5/2010 | Butler | A61G 7/05715 | 5/81.1 R |
| 8,296,887 | B2 * | 10/2012 | Doehler | A61G 7/1021 | 5/713 |
| 8,756,737 | B2 * | 6/2014 | Chan | A61G 7/05776 | 5/713 |
| 9,554,956 | B2 * | 1/2017 | Reiners | A47C 27/10 | |
| 11,246,775 | B2 * | 2/2022 | Galer | A61G 7/05776 | |
| 11,331,235 | B2 * | 5/2022 | Kurt | A61G 7/1021 | |
| 2007/0143928 | A1 | 6/2007 | Biggie | | |
| 2008/0040860 | A1 | 2/2008 | Price | | |
| 2013/0219628 | A1 * | 8/2013 | Blanchard | A61G 7/001 | 5/713 |
| 2014/0007353 | A1 * | 1/2014 | Stryker | A61G 7/05723 | 5/715 |
| 2014/0345060 | A1 | 11/2014 | Ribble | | |

OTHER PUBLICATIONS

Office Action from European Patent App. No. 20845772.1 (Feb. 16, 2024).

Search Report from Chinese Patent App. No. 2020800909376 (May 6, 2024).

* cited by examiner

INFLATABLE MAT FOR USE IN LATERAL POSITIONING

This application claims the benefit of Danish Application No. PA 2019 01423 filed Dec. 3, 2019 and PCT/DK2020/050344 filed, International Publication No. WO 2021/110227 A1, which are hereby incorporated by reference in their entirety as if fully set forth herein.

FIELD OF THE INVENTION

The present invention relates to a mat for use in lateral positioning.

BACKGROUND OF THE INVENTION

A mat for lateral positioning of patients in partial lateral decubitus has been designed to relieve pressure on bone protrusions on the patient's back of head, back, buttocks and feet in the supine position by placing the mat under the existing mattress.

One type of known mats with similar functions is typically complex air mattresses, where the patient is located directly on the cover of the mattress or using a thin top mattress. Another type is a mattress designed with a relieving angle on one side of the mattress, but without counter-support on the opposite side of the mattress. However, this does not provide the optimal positioning effect for very weak patients, as there is a risk of skin shearing on the patient's back when the height of one side of the mat is increased, whereby the patient slides down towards the opposite side.

An example is described in US2007143928A1, which includes a sleeping mat able to perform lateral rotation of a patient lying on the sleeping mat. The sleeping mat comprises a surface, on the right and left side of which turning pads are fitted, which are individually inflatable, each extending in the longitudinal direction of the mat. Each turning pad includes a number of transverse sections, which are used to turn a patient using coordinated inflation or deflation of air to/from the transverse sections. On top of the turning pads, an air cell system is mounted, consisting of a right and a left row of inflatable elements extending across the surface from the centre and towards the sides. The height of the sleeping mat is defined by the total height of the air cell system and the turning pads. This mattress is designed with a relieving angle on one side when inflating, but without the important counter-support on the opposite side.

OBJECT OF THE INVENTION

The object of the invention is thus to provide a mat with optimal positioning effect, which cyclically has a combination of relieving effect when positioning patients in lateral decubitus, while at the same time establishing a moderate counter-support on the opposite side of the mat, in part to maintain the patient's position on the mat when changing the lateral decubitus from side to side as well as to provide the patient with a sense of security.

It is a further object of the invention to provide a mat in the form of a disposable product that improves hygiene and minimises bacterial spread, the mat being easily disposable after use.

DESCRIPTION OF THE INVENTION

The invention addresses the above issue by providing an inflatable mat for use in lateral positioning in angled lateral decubitus, the mat comprising:

- a mat foil with a longitudinal direction, the mat foil having an upper side and a first side extending in the longitudinal direction, and a second side extending in the longitudinal direction;
- a first longitudinal section, comprising one or more inflatable air chambers, being arranged on the upper side of the mat foil along the first side of the mat foil, and a second longitudinal section, comprising one or more inflatable air chambers, being arranged on the upper side of the mat foil along the second side of the mat foil;
- the mat foil having a centre in the longitudinal direction, one or more first transverse sections, each comprising one or more inflatable air chambers, being arranged successively in a row along the longitudinal direction, the first transverse sections extending from the centre out towards the first side, so that the one or more transverse sections are arranged lying above the first longitudinal section away from the mat foil, one or more second transverse sections, each comprising one or more inflatable air chambers, being arranged successively in a row along the longitudinal direction, and transverse sections extending from the centre out towards the second side, the transverse sections being arranged lying above the second longitudinal section away from the mat foil;
- wherein the first longitudinal section, the second longitudinal section and the one or more first transverse sections and the one or more second transverse sections are connected to one or more air ducts arranged in each of the inflatable air chambers of said longitudinal and transverse sections, wherein the longitudinal and transverse sections can be individually inflated;
- the first side of the mat having a total first lateral height, which is the sum of a height of the first longitudinal section in the inflated state and a height of the first transverse section in the inflated state, the second side of the mat having a total second lateral height, the second lateral height being the height of the second longitudinal section in the inflated state;

or

- the second side of the mat having a total second lateral height, which is the sum of a height of the second longitudinal section in the inflated state and a height of the second transverse section in the inflated state, the first side of the mat having a total first lateral height, the first lateral height being the height of the first longitudinal section in the inflated state.

In use, the first position is arranged by providing a height of the mat on the first side. The height is determined by inflating the first longitudinal section and the one or more first transverse sections. Furthermore, the second longitudinal section on the second side of the mat is inflated. The mat provides a slight raising of the mat on the opposite side of the relieving angle, wherein the patient is positioned on one side, providing a weak counter-support on the patient and a sense of security for the patient.

The inflatable mat for use in lateral positioning in, for example, 25-30 degrees lateral decubitus comprises at least three sections with a number of air chambers, each of which may have a valve device. At least an individual transversely divided left inflatable section and an individual transversely divided right inflatable section with arbitrary shape, located on top of at least a longitudinal through-going inflatable section along the right and left sides of the mat, respectively. The interconnection between the air chambers of the transverse sections may consist of an air duct or ducts. The height of the mat when inflating the individual transversely divided side section has a total height at the long side of the mat corresponding to the sum of the height of the transversely divided section and the height of the longitudinal underlying section in the inflated states. The height of the mat at the centre of the mat corresponds to the height of the transversely divided section in the inflated state, the height of the mat on the opposite side corresponding to the height of the longitudinal through-going section in the inflated state.

By patient herein is primarily meant immobile persons who are lying on their backs and are at risk of developing pressure ulcers. However, patient should also be understood as all other persons and users who may benefit from, desire or need said mat.

In use, the second position is arranged by providing a height of the mat on the first side. The height is determined by inflating the second longitudinal section and the one or more second transverse sections. Furthermore, the first longitudinal section is maintained inflated on the first side of the mat. This will also provide the mat with a slight raising of the mat on the opposite side of the relieving angle, providing a slight counter-support on the patient, now lying on the other side. A relieving lateral positioning of the patient and a simultaneous opposite moderate angling of the mat for counter-support of the patient minimise the risk of shear.

The inflatable mat comprises longitudinal sections with at least one or more inflatable air chambers. The connection and division between the individual air chambers may consist of an air hose or a narrowing of the air-empty pattern enclosing air chambers. A first airtight foil layer and a second airtight foil layer being partially fixed to each other by means of a pattern of an airtight interconnection forming the sides and peripheral edge of an inflatable chamber with at least a first section, the inflatable chambers including at least one valve device.

The mat allows for positioning the patient in 25-30 degrees lateral decubitus. The mat consists of at least three individual inflatable sections, each of which may be divided into a number of air-connected chambers, a first air section forming a vertically oriented section on the left side of the mat, a second air section forming a vertically oriented section on the right side of the mat, a third air section forming an overlying horizontally divided section on the left side from the outer edge in towards the centre, and a fourth air section forming an overlying horizontally divided section on the right side of the mat from the outer edge in towards the centre. The air chambers of the longitudinal sections, which lie along the longitudinal sides of the mat, are constantly inflated, whereas the overlying air chambers on the left and right sides, respectively, are inflated in sequence so that when one side is inflated, the other side is flat and vice versa. Thus, when inflating, the respective right and left sides of the mat constitute a triangle, which is highest at the outer longitudinal sides of the mat and lowest at the centre of the mat, the side with the inflated overlying air section forming a first position with an angle in relation to the mat of 25-30 degrees, and the opposite side forming a second position with an angle of 5-7 degrees in relation to the mat.

The longitudinal sections and the transverse sections comprise at least three sections, each section having at least one first airtight foil layer and at least one second airtight foil layer, the first foil layer and the second foil layer being partially fixed to each other by means of a contiguous pattern of an airtight interconnection forming the peripheral edge of at least one inflatable chamber comprising a valve device.

Another embodiment is that the first longitudinal section, the second longitudinal section and the one or more first transverse sections and the one or more second transverse sections are attached to the mat foil using fasteners.

The first longitudinal section is attached to the mat foil along the first side. The second longitudinal section is attached to the mat foil along the second side. The first longitudinal sections are attached along the centre of the mat foil and extend beyond the first longitudinal section. The first longitudinal sections can each be attached to the first longitudinal section. The second longitudinal sections are attached along the centre of the mat foil adjacent to the first longitudinal sections, the second transverse sections extending beyond the second longitudinal section. The second longitudinal sections can each be attached to the second longitudinal section. This ensures that the transverse sections do not move during inflating and when the air is released.

A further embodiment is that the one or more first transverse sections are connected to a first air duct, and the one or more second transverse sections are connected to a second air duct.

A further embodiment is an electric pump connected to the one or more air ducts using a device, the electric air pump being able to inflate said longitudinal sections and air chambers through the air ducts.

A further embodiment is that at least part of the mat includes a non-woven material.

It may occur that the patient needs to lie on the mat for longer periods of time. It is therefore important for the patient to feel that the mat is comfortable to lie on. One of these properties comes from choosing a material that is moisture and heat-diverting.

In a further embodiment, the surface of the mat may comprise a fire retardant. It is a great advantage for the surface of the mat to include fire retardants. This makes it possible to create the surface of the mat so that it is safe from burning. The fire retardants may be in the form of an impregnated preparation treated in connection with the mat or/and the material of the cover or in connection with other layers of the mat.

A further embodiment is that the mat is arranged inside or partially inside an integrated cover. Providing a mat in the form of a patient-specific disposable mat improves hygiene and minimises bacterial spread. The mat can be quickly disposed of after use and replaced with a new one. The mat may be impregnated with an antibacterial.

A method for using an inflatable mat in lateral positioning in angled lateral decubitus, comprising the steps of:

- providing an inflatable mat;
- inflating a first longitudinal section and one or more first transverse sections to a predefined first height from the mat foil of the mat;
- inflating a second longitudinal section to a predefined second height from the mat foil of the mat;
- maintaining a first position for a predefined first period of time, so that a patient can be placed in a lateral position in angled lateral decubitus with support on a one side.

For example, a predefined cycle of lifting height on one side may be an inflation of the mat, which provides 25-30 degrees lateral decubitus and at the same time a lifted opposite side, which ensures a slight counter-support of the patient, which is achieved by inflating first and second transverse sections. The transverse sections may be individually connected to an air pump together with a constantly inflated individually connected longitudinal section, which is located on each long side of the mat below the first and second longitudinal sections, respectively, which are inflated in cycles.

The method comprises the further steps of:

releasing air from the one or more first transverse sections;

inflating one or more second transverse sections to a predefined first height from the mat foil of the mat;

maintaining a second position for a predefined second period of time, so that a patient can be placed in a lateral position in angled lateral decubitus with support on a second side.

The method comprises the further step of:

inflating the longitudinal sections and the transverse sections using an electric air pump.

The invention has now been explained by reference to a few embodiments, which have only been discussed to illustrate the many possibilities that can be achieved by using an inflatable mat for use in lateral positioning.

DESCRIPTION OF THE DRAWINGS

A selection of the embodiments of the invention are described in the following with reference to.

DETAILED DESCRIPTION OF THE INVENTION

Figure 1:
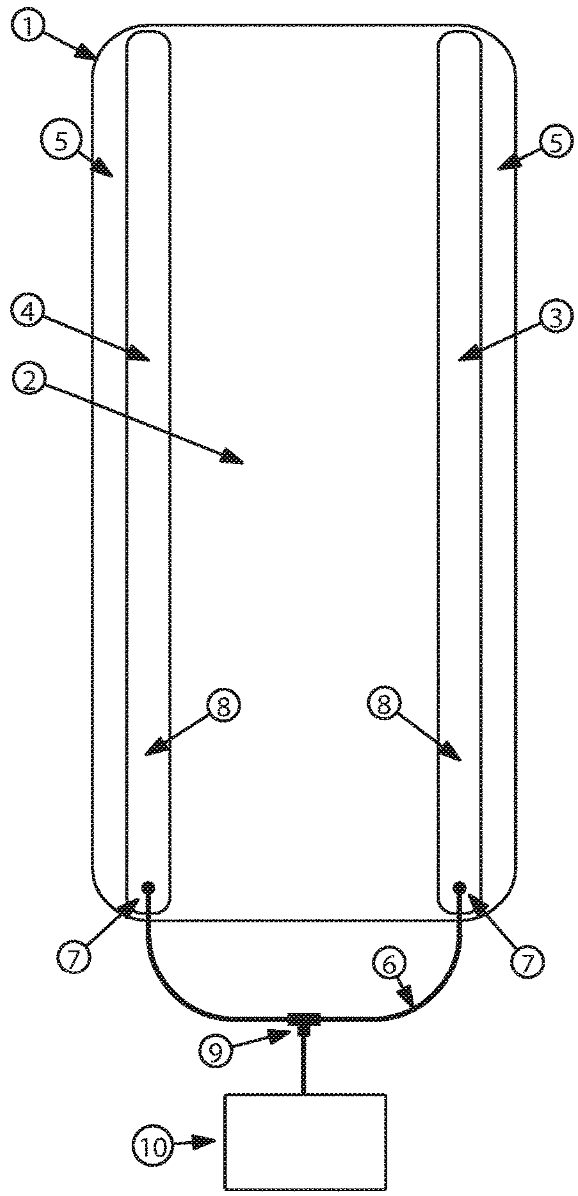
FIG. 1 shows an inflatable mat for use in lateral positioning seen from above.

Embodiments of the invention are explained in the following detailed description of the invention. It should be understood that the invention is not limited in its scope to the following illustrations in the drawings. The invention is capable of other embodiments being practised and designed in various ways.

FIG. 1 shows an outer contour of an inflatable surface 1 seen from above, an individual mat foil 2 with mounted longitudinal sections 3, 4 being arranged on the left and right sides of the mat 1, respectively, so that the upper side faces away from the sleeping bed. The longitudinal sections 3, 4 are arranged along the long sides 5, first and second sides of the mat. The two longitudinal sections are each connected to air hose 6 through an individual valve device 7. Each of the individual air chambers in the longitudinal sections 3, 4 is enclosed by a contiguous peripheral contour 8 and with further connection 9 to electric pump 10.

Figure 2:
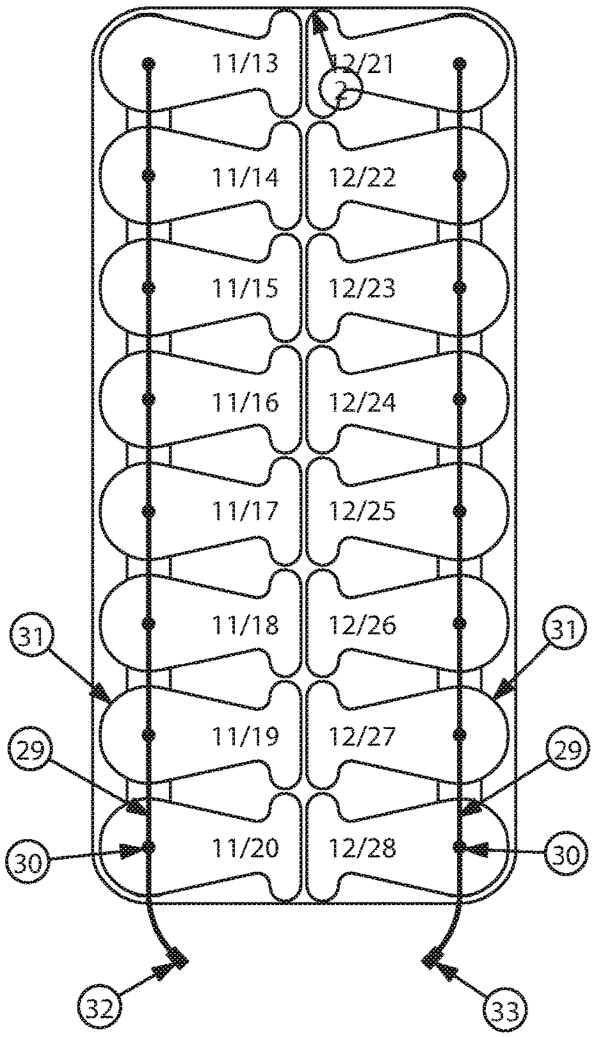
FIG. 2 shows an inflatable mat seen from above with two sets of individual air sections.

FIG. 2 shows inflatable mat 1 seen from above with two sets of individual transverse sections, a left section 11 and a right section 12, respectively. The individual transverse sections are located on top of the two longitudinal sections 3, 4, which are located along the long sides 5 of the mat. The individual air chambers 13-28 of the two individual transverse sections 11, 12 are interconnected by individual air hoses 29. The individual air chamber is connected through individual valve devices 30. The individual air chamber is enclosed by a contiguous peripheral contour 31 and arranged with further connection 32, 33 to electric pump 10.

Figure 3:
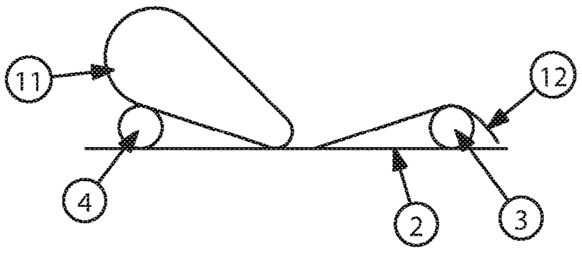
FIG. 3 shows inflatable mat 1 seen in a cross section.

FIG. 3 shows inflatable mat 1 seen in a cross section. The first side of the mat 1 corresponds to the first side of the mat foil 2. The first side of the mat 1 has a total first lateral height, which is the sum of the height of the first longitudinal section 4 in the inflated state and a height of the first transverse section 11 in the inflated state. The second side of the mat 1 has a total second lateral height, the second lateral height being the height of the second longitudinal section 3 in the inflated state.

A method for using an inflatable mat 1 in lateral positioning in angled lateral decubitus, comprising the following steps for providing an inflatable mat 1, wherein the first longitudinal section 4 and the first transverse section 11 are inflated to a predefined first height from the mat foil 2 of the mat 1.

Furthermore, the second longitudinal section 3 is inflated to a predefined second height from the mat foil 2 of the mat 1. The mat is maintained in a first position for a predefined first period of time, so that a patient may be placed in a lateral position in angled lateral decubitus using the first longitudinal section 4 and the first transverse section 11 with support on a one side using the second longitudinal section 3.

After inflating, the surface of the first transverse section 11, which is further lifted by the first longitudinal section 4, forms an angle of the lateral decubitus in relation to the mat foil 2 of e.g. 25-30 degrees. The height at the centre of the mat corresponds to the height of the individual air chambers 13-20. The surface of the second transverse section 12 together with the longitudinal section 3 at the same time after inflating forms an angle in relation to the mat foil 2 of e.g. 5-7 degrees.

Alternatively, the second side of the mat 1 may have a total second lateral height, which is the sum of a height of the second longitudinal section 3 in the inflated state and a height of the second transverse section 12 in the inflated state, the first side of the mat 1 having a total first lateral height, the first lateral height being the height of the first longitudinal section 4 in the inflated state.

The method comprises further steps for turning the lateral decubitus to the other side. The air is let out of the first transverse section 11. The second transverse section 12 is then inflated to a predefined first height from the mat foil 2 of the mat 1. The mat is maintained in a second position for a predefined second period of time, so that a patient may be placed in a lateral position in angled lateral decubitus on the other side with support on a second side with support from the first longitudinal section 4.

LIST OF REFERENCE DESIGNATIONS

1 Outer contour of inflatable mat for lateral positioning in partial lateral decubitus
2 Mat foil
3 Inflatable second longitudinal section
4 Inflatable first longitudinal section
5 Long sides of the mat
6 Air connection between the two longitudinal sections
7 Individual valve device
8 Contiguous outer contour
9 Connection to electric pump
10 Electric pump
11 First transverse section
12 Second transverse section
13-20 Individual air chambers, left side
21-28 Individual air chambers, right side
29 Individual air hose
30 Individual valve device
31 Outer contiguous contour of air chamber
32-33 Connection to electric pump

The invention claimed is:

1. An inflatable mat for use in lateral positioning in angled lateral decubitus, the mat (1) comprising:

a mat foil (2) with a longitudinal direction, the mat foil (2) having an upper side and a first side extending in the longitudinal direction, and a second side extending in the longitudinal direction of the mat foil (2);

a first longitudinal section (4), comprising one or more inflatable air chambers, being arranged on the upper side of the mat foil (2) along the first side of the mat foil (2), and a second longitudinal section (3), comprising one or more inflatable air chambers, being arranged on the upper side of the mat foil (2) along the second side of the mat foil (2);

the mat foil (2) having a centre in the longitudinal direction, one or more first transverse sections (11), each comprising one or more inflatable air chambers (13-20), being arranged successively in a row along the longitudinal direction, the first transverse sections (11) extending from the centre out towards the first side, so that the one or more transverse sections (11) are arranged lying above the first longitudinal section (4) away from the mat foil (2), one or more second transverse sections (12), comprising one or more inflatable air chambers (21-28), being arranged successively in a row along the longitudinal direction, and transverse sections extending from the centre out towards the second side, transverse sections (12) being arranged lying above the second longitudinal section (3) away from the mat foil (2);

wherein the first longitudinal section (4), the second longitudinal section and the one or more first transverse sections (11) and the one or more second transverse sections (12) are connected to one or more air ducts (6, 29) arranged in each of the inflatable air chambers of said longitudinal and transverse sections, wherein the longitudinal sections (3, 4) and transverse sections (11, 12) can be individually inflated; and the mat (1) being configured to be in:

a first lateral inflated state, wherein the first side of the mat (1) has a total first lateral height, which is the sum of a height of the mat foil (2), a height of the first longitudinal section (4) in the inflated state and a height of the first transverse section (11) in the inflated state, the second side of the mat (1) has a total second lateral height, the second lateral height being the sum of the height of the mat foil (2) and the height of the second longitudinal section (3) in the inflated state, and a centre of the mat (1) has a total central height, which is the height of the mat foil (2); or a second lateral inflated state, wherein the second side of the mat (1) has a total second lateral height, which is the sum of a the height of the mat foil (2), a height of the second longitudinal section (3) in the inflated state and a height of the second transverse section (12) in the inflated state, the first side of the mat (1) has a total first lateral height, the first lateral height being the sum of the height of the mat foil (2) and the height of the first longitudinal section (4) in the inflated state, and the centre of the mat (1) has the total central height, which is the height of the mat foil (2).

2. The inflatable mat according to claim 1, wherein the first longitudinal section (4), the second longitudinal section (3) and the one or more first transverse sections (11) and the one or more second transverse sections (12) are attached to the mat foil (2) using fasteners.

3. The inflatable mat according to claim 1, wherein the one or more first transverse sections (11) are connected to a first air duct, and the one or more second transverse sections (12) are connected to a second air duct.

4. The inflatable mat according to claim 1, wherein an electric pump is connected to the one or more air ducts using a device, the electric air pump being able to inflate said longitudinal sections (3, 4) and air chambers (11, 12) through the air ducts.

5. The inflatable mat according to claim 1, wherein at least part of the mat (1) comprises a non-woven material.

6. The inflatable mat according to claim 1, wherein the surface of the mat (1) comprises a fire retardant.

7. The inflatable mat according to claim 1, wherein the mat (1) is arranged inside or partly inside an integrated cover.

8. A method for using an inflatable mat in lateral positioning in angled lateral decubitus, comprising the steps of:

providing an inflatable mat (1) according to claim 1;

inflating a first longitudinal section (4) and one or more first transverse sections (11) to a predefined first height from the mat foil (2) of the mat (1);

inflating a second longitudinal section (3) to a predefined second height from the mat foil (2) of the mat (1);

maintaining a first position for a predefined first period of time, so that a patient can be placed in a lateral position in angled lateral decubitus with support on a one side.

9. The method according to claim 8, comprising the further steps of:

releasing air from the one or more first transverse sections (11);

inflating one or more second transverse sections (12) to a predefined first height from the mat foil (2) of the mat (1);

maintaining a second position for a predefined second period of time, so that a patient can be placed in a lateral position in angled lateral decubitus with support on a second side.

10. The method according to claim 8, comprising the further step of: inflating the longitudinal sections (3, 4) and the transverse sections (11, 12) using an electric air pump.

11. The inflatable mat according to claim 1, wherein the first transverse section (11) and the second transverse section (12) are attached to the mat foil (2) along the centre of the mat (1) in the longitudinal direction, wherein the first longitudinal section (4) is attached to the mat foil (2) on the first side of the mat foil (2) and the second longitudinal section (3) is attached to the mat foil (2) on the second side of the mat foil (2).

12. The inflatable mat according to claim 1, wherein in both the first lateral inflated state and second lateral inflated state, the first transverse section (11) and the second transverse section (12) form a V-shaped profile with a depression around the centre of the mat (1) with respect to both the first side and the second side of the mat foil (2), the profile providing lateral positioning of a patient on one side and a counter-support for the patient on an opposite side.

13. The inflatable mat according to claim 1, wherein the first longitudinal section (4) is positioned in proximity of a first edge on the first side of the mat foil (2), and the second longitudinal section (3) is positioned in proximity of a second edge of the second side of the mat foil (2), and wherein the first transverse section (11) extends from the center of the mat foil (1) to the first edge and the first longitudinal section (4), and wherein the second transverse section (12) extends from the center of the mat foil (1) to the second edge over the second longitudinal section (3).

14. The inflatable mat according to claim 1, wherein both the first longitudinal section (4) and the second longitudinal section (3) have an elongated shape extending along the longitudinal direction of the mat foil (2) on respectively the first edge and the second edge.

* * * * *